Nov. 8, 1955  S. B. WHITELEY  2,723,139
WINDSCREEN WIPER MOUNTING
Filed March 21, 1950
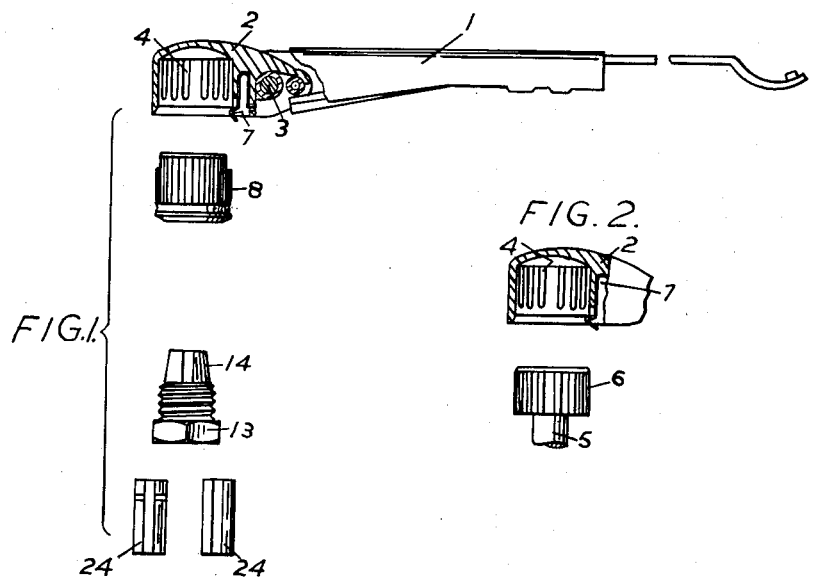
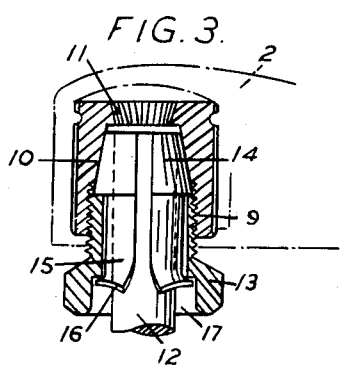
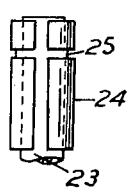
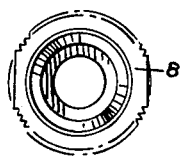
Inventor
Stanley Bernard Whiteley
By
Bean, Brooks, Buckley & Bean. Attorneys

United States Patent Office 2,723,139
Patented Nov. 8, 1955

2,723,139
WINDSCREEN WIPER MOUNTING

Stanley Bernard Whiteley, Twickenham, England, assignor to Trico Products Corporation, Buffalo, N. Y., a corporation of New York Application March 21, 1950, Serial No. 150,834

3 Claims. (Cl. 287—53)

This invention relates to windscreen wipers and is concerned in particular with means for attaching a windscreen wiper arm to its actuating shaft.

For attaching a windscreen wiper arm to its actuating shaft, according to one practice which is commonly adopted, the inner end of the wiper arm is formed or provided with a mounting socket and a cylindrical head is fixed to the end of the actuating shaft. The peripheral surface of the head is splined or fluted and engages in the mounting socket of the arm, which is correspondingly splined or fluted, so that relative rotation between the arm and the actuating shaft is prevented. Locking means, for example a spring catch which engages the head, is also provided in order to retain the head in the mounting socket and to allow it to be detached when necessary.

According to another practice which is also in common use, the inner end of the wiper arm is formed or provided with a mounting socket the outer portion of which is screw-threaded and the inner portion of which is conical or tapering, and the actuating shaft is connected to the arm by means of a collar, usually a split metal collar, which is forced into engagement with the shaft and with the conical inner portion of the mounting socket by means of an externally threaded nut or sleeve which screws into the threaded portion of the mounting socket.

Obviously, an arm intended to be attached to an actuating shaft having an enlarged head cannot be connected to an actuating shaft which is intended to be connected by means of a nut and collar as aforesaid and vice versa; consequently, it is necessary for arms of a number of different kinds to be manufactured and kept in stock, so that when it is necessary to replace an arm, an arm having a mounting socket of the appropriate kind may be available.

Now the object of the present invention is to provide improved mounting means which enables one and the same arm to be attached to an acuating shaft of either of the kinds referred to.

According to the invention, the wiper arm is provided at its inner end with a mounting socket which is adapted to engage a head on the actuating shaft and is also provided with a detachable bush, which is engageable with the mounting socket, and with a collar, which is insertible in the bush, and with means for fixing the bush to an actuating shaft, for example a collar which is insertible in the bush and a nut or sleeve which can be screwed into the bush to clamp the collar between the bush and the shaft. If then the wiper arm is to be attached to a shaft having an enlarged head as first described, the bush is removed from the mounting socket and discarded and the mounting socket is fitted directly on to the enlarged head of the shaft. If, on the other hand, the arm is to be attached to an actuating shaft of smaller diameter than the mounting socket, the bush is allowed to remain in the mounting socket and the arm is fixed to the shaft by forcing the collar into engagement both with the bush and with the actuating shaft by screwing the nut or sleeve into the bush.

The bush is provided with suitable means for preventing rotation relatively to the mounting socket, for which purpose its outer peripheral surface may be splined or serrated so as to coact with the correspondingly splined or serrated internal periphery of the mounting socket.

For co-operating with the collar and nut or sleeve, the bush is screw-threaded internally at its outer end, and adjacent thereto has a conical portion for co-operating with the collar, which is of corresponding conical shape, so as to contract the collar on to the shaft when the nut is screwed up.

In addition, for enabling the arm to be fixed to unthreaded actuating shafts of different diameters, there may be provided a number of sleeves of different thicknesses which can be fitted over the shaft.

For securing the bush in position in the mounting socket, the mounting socket may be provided with a lateral chamber in which is fitted a resilient catch which engages over the outer end of the bush.

Preferably, the mounting socket is open only to the underside of the arm in which case the nut which screws into the outer end of the bush has an axial bore, through which the actuating shaft is passed.

Alternatively, the mounting socket may be open to both sides of the arm, in which case the actuating shaft may be passed into the mounting socket from the underside and the nut, which in this case is not provided with an axial bore, is screwed into the mounting socket from the outside.

Preferably, the collar is connected to the nut in such a manner as to be rotatable, but not axially displaceable, relatively to the nut, in order to facilitate removal of the collar. The collar and nut may, however, be separate or the collar may be integral with or rigidly connected to the nut.

In order that the invention may be easily understood and readily carried into effect, mounting means in accordance with the invention, is illustrated, by way of example, in the accompanying drawing, in which:

Figure 1 is a side elevation partly in section showing the actuating arm, the bush, the nut and collar and the sleeve;

Figure 2 is a section through the mounting socket showing the arm about to be attached to a shaft having an enlarged head;

Figure 3 is a sectional view through the mounting socket showing it attached to a shaft without an enlarged head;

Figure 4 is a detail view showing a sleeve fitted onto the shaft; and

Figures 5 and 6 are plan views respectively of the sleeve and the bush.

Referring to the drawing, the windshield wiper arm, which is generally designated by the numeral 1 and may be of any desired construction, is provided at its inner end with a mounting socket 2 which is pivoted to the arm by means of a pivot 3. The mounting socket 2 is provided with serrations 4 on its inner surface.

If the mounting socket 2 is to be fitted to an actuating shaft 5 having a fixed head 6 of a standard type as shown in Figure 2, the mounting socket 2 is placed on the head 6 with the serrations in the socket in engagement with matching serrations provided around the periphery of the head 6. The mounting socket may be retained on the head by means of a resilient catch 7 which is fitted in a chamber in a mounting socket.

If now the mounting socket 2 is to be mounted on a shaft 12 which is not provided with an enlarged head, a bush 8, having peripheral serrations which are adapted to engage the serrations 4 of the mounting socket, is inserted in the socket 2, as shown in Figure 3. The bush 8 is internally screw-threaded at its outer end as indicated at 9, and adjacent the screw-threaded portion is provided with a conical or tapering portion 10. Adjacent the conical portion 10 the bush is provided with a knurled or milled counterbore 11. For fixing the bush to the shaft 12 there is employed a nut or sleeve 13 and a split conical collar 14. The collar 14 and the nut 13 may be separate, but in the example illustrated, the collar 14 is attached to the nut in such a manner as to move axially therewith but to be rotatable relatively thereto. For this purpose the collar 14 has an extension 15 which is passed through the sleeve or nut 13 and the end 16 of which is flanged over to engage in a counterbore 17 in the sleeve or nut 13. The sleeve or nut is then engaged at one end by the wider part of the conical collar and near the opposite end by the flange in the counterbore 17.

To fix the bush to the shaft 12, the shaft is passed through the sleeve or collar in the manner indicated in Figure 3, and the nut or sleeve 13 is screwed into the bush 8. The split collar 14 is thereby forced into engagement both with the shaft 12 and the conical portion 10 of the bush, and the mounting socket is securely fixed to the shaft.

In order to release the arm, the sleeve or nut is unscrewed and the collar is withdrawn by the nut; the removal of the arm can, therefore, be effected, when necessary, more easily than if the collar and nut are separate because the collar may become wedged in the conical portion of the bush.

If the mounting socket is to be mounted on a shaft 23, which is of smaller diameter than the shaft 12 shown in Figure 3, a split sleeve 24 is first placed over the shaft before the nut 13 and the collar are screwed into the bush. As is shown in Fig. 4, the sleeve 24 may be formed with a groove 25 near its outer end.

Thus, by supplying an actuating arm having a mounting socket 4, with the bush 8, the collar 14 and nut or sleeve 13, and sleeve 24, the same arm can be fixed to a number of different standard kinds of actuating shafts. If the arm is to be mounted on a headed shaft as shown in Figure 2, the parts 8, 13, 14 and 24 are discarded. If the arm is to be mounted on a shaft 12 which is not provided with an enlarged head, the bush 8, nut 13 and collar 14 are used and the remaining parts are discarded.

I claim:

1. Means for mounting a windscreen wiper arm on an actuating shaft, comprising a mounting socket on the arm, said socket being open only to the underside of the arm, a bush insertible in said mounting socket, means for preventing relative rotation between said bush and mounting socket, said bush having an internal screw-threaded portion adjacent its outer end and a conical portion adjacent said screw-threaded portion, a collar engageable with said conical portion of said bush, and a nut screwed into said screw-threaded portion of said bush, said nut having a bore through which the actutaing shaft may be passed, said collar being attached to the nut in such a manner as to be rotatable relatively thereto, but axially displaceable therewith.

2. Means for mounting a windscreen wiper arm on its actuating shaft, comprising a mounting socket on the arm, a bush insertible in the mounting socket, means for preventing relative rotation between the bush and the mounting socket, said bush having an internal screw-threaded portion adjacent its outer end and a conical portion adjacent said screw-threaded portion, a nut screwed into the screw-threaded portion of said bush, said nut having an axial bore, a conical collar having an extension which passes through said bore, a flange on said collar and a counterbore in said nut in which said flange engages.

3. Means for mounting a windscreen wiper arm on an actuating shaft, comprising a mounting socket on the arm, said socket being open only to the underside of the arm, a bush insertible in the said mounting socket, means for preventing relative rotation between said bush and said mounting socket, said bush having an internal screw-threaded portion adjacent its outer end and a conical portion adjacent said screw-threaded portion, a collar engageable with said conical portion of said bush, and a nut screwed into said screw-threaded portion of said bush, said nut having an axial bore, and a sleeve insertible over said actuating shaft and within said bore of said nut.

References Cited in the file of this patent

UNITED STATES PATENTS

| | | |
|---|---|---|
| 54,113 | Clark | Apr. 24, 1866 |
| 1,420,295 | Tait | June 20, 1922 |
| 2,286,035 | Horton et al. | June 9, 1942 |
| 2,499,809 | Zaiger | Mar. 7, 1950 |
| 2,511,129 | Schaal | June 13, 1950 |
| 2,557,755 | Nesson | June 19, 1951 |
| 2,587,862 | Krucki | Mar. 4, 1952 |

FOREIGN PATENTS

| | | |
|---|---|---|
| 497,366 | Great Britain | of 1938 |